United States Patent Office 2,757,553
Patented Aug. 7, 1956

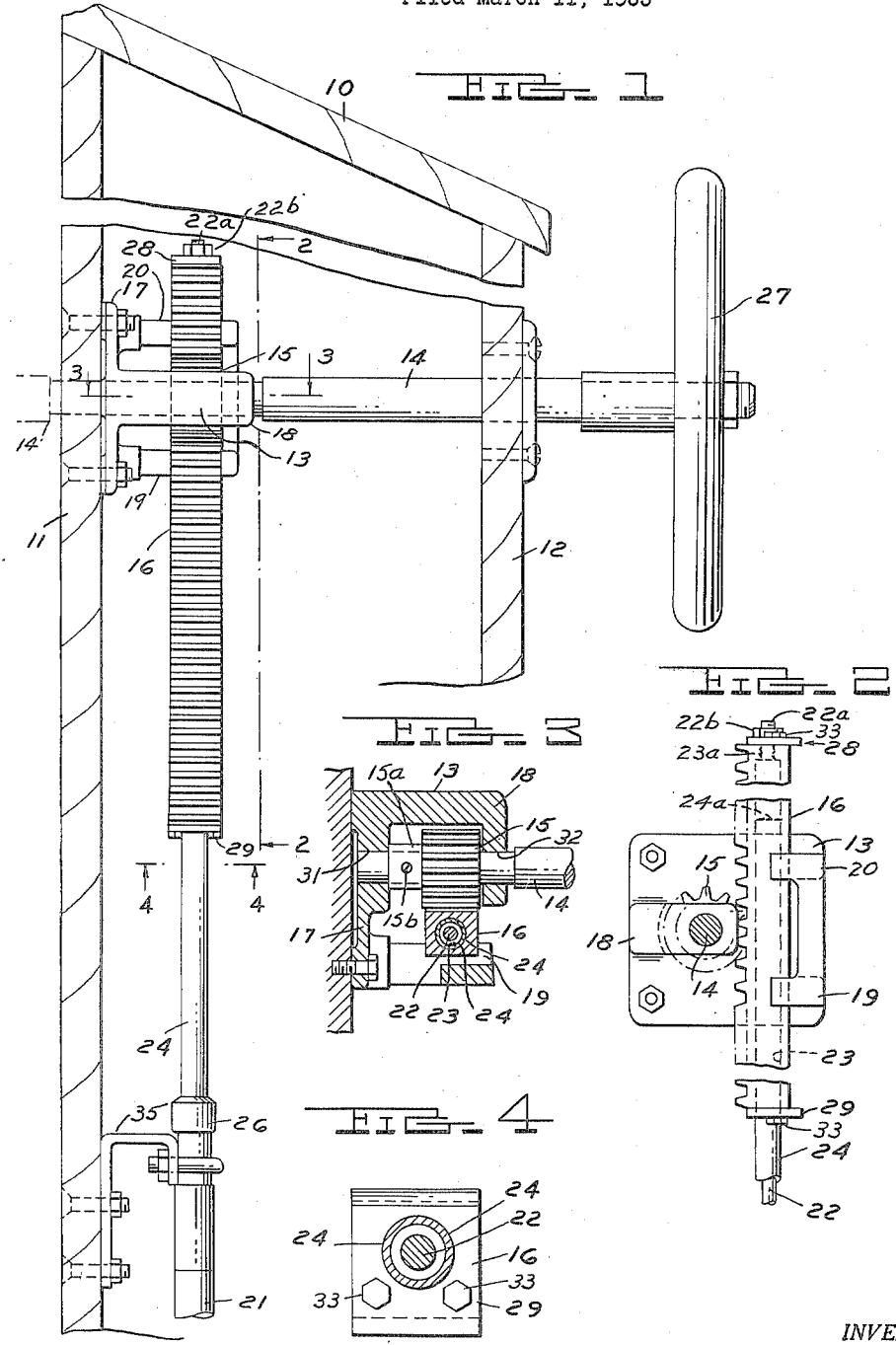

2,757,553

STEERING CONTROL MECHANISM

Russell G. Marr, Detroit, Mich.

Application March 11, 1955, Serial No. 493,693

7 Claims. (Cl. 74—507)

This invention relates to a mechanism for controlling the position of the movable element of a push-pull cable, and is particularly suited for use as a steering control mechanism for watercraft, particularly small craft such as outboards, runabouts and cruisers.

The watercraft field provides an excellent example of the utility of the invention. To my knowledge no standardized steering mechanism for watercraft generally has been developed, and this seems to be due principally to the fact that there are such wide differences in the location of a steering control and in the structure provided for mounting the control.

Within certain limits of size, the push-pull type of cable, so commonly employed for various remotely actuated controls, forms a very convenient device for controlling the position of a rudder. My invention is directed to a mechanism for operating the push-pull element of the cable, or movable element, within the outer casing thereof.

According to the invention I provide a socket member dimensioned to receive one end of the cable casing for sliding telescoping movement relative thereto. The socket member also receives the end of the movable cable member and is secured thereto. Thus the socket member acts as a telescoping extension of the cable casing, or as a guide for the push-pull member so that a wide range of controlled movement of the push-pull member can be obtained relative to the casing of the cable which is stationary. Preferably, the socket member forms part of a rack bar, and the invention also contemplates a simple supporting bracket to slidably support the rack bar and to mount a pinion which engages the rack and is secured to a control shaft. A conventional steering wheel or any other suitable device for operation by a helmsman is secured to this shaft.

To simplify the mounting problems and provide a device which can be standardized for a number of different types and sizes of boats, the supporting bracket is made so that the rack can be inserted in the bracket from either direction. The bracket is also made so that the shaft carrying the pinion can be inserted in the bracket from either direction relative to its base.

A presently preferred embodiment of the invention is disclosed in the accompanying drawing in which:

Fig. 1 is a side elevational view of a section taken through a control pedestal or bridge of a small cruiser, showing the steering control mechanism of the invention mounted in a vertical position;

Fig. 2 is a transverse elevation taken along the line 2—2 of Fig. 1;

Fig. 3 is an enlarged sectional plan view taken through the axis of the control shaft on the line 3—3 of Fig. 1; and Fig. 4 is an enlarged sectional view taken along the line 4—4 of Fig. 1.

Referring to Fig. 1, the control tower or pedestal is generally indicated by the reference 10 and comprises a bulkhead 11 and an outer panel 12 which extend vertically and transversely of the boat. A supporting bracket for the steering mechanism is generally designated by the reference 13, and is secured to the bulkhead 11 by bolts, as shown. A steering shaft 14 is carried by the bracket 13 and projects through the outer panel 12. Mounted within the bracket are a pinion 15 and a rack 16, the pinion including a collar 15a and set screw 15b which enables it to be secured on the shaft 14 for rotation therewith.

Steering shaft 14 is preferably carried by the bracket 13 on two spaced journals. One journal 31 is drilled in a thickened portion of the base 17 of the bracket. The second journal 32 is formed in a shaft supporting member 18 of the bracket structure. These journals 31 and 32 are preferably formed on the same diameter, so that the shaft 14 can be inserted into engagement with them from either direction relative to the base 17 of the bracket structure. The bracket structure further includes cradle members 19 and 20 (Figs. 1 and 2), each of which is formed with a notch dimensioned to slidably engage the surface of the rack 16, as can be seen in Fig. 3.

In the construction shown, rack 16 forms a socket member in which one end of a push-pull cable assembly 21 is received. The socket is formed by a bore 23 extending longitudinally through the major length of the body of the rack and terminating in a threaded portion 23a of reduced diameter. Cable assembly 21 consists of an outer casing and a movable member 22 contained therein. In the construction illustrated, the movable member 22 is a flexible rod which extends beyond the end of the outer casing of the cable and is provided with a threaded end 22a. The terminal portion of the cable casing includes a sleeve member 24, connected to the main portion of the casing by a universal or flexible joint 26.

The major length of the internal bore 23 of the socket member is dimensioned for sliding telescoping engagement with the sleeve member 24 which forms the end of the cable casing. The remaining threaded portion 23a of the bore 23 is threaded and dimensioned to engage the threaded end 22a of the movable cable member 22. A lock nut 22b is preferably employed to securely retain the movable cable member 22 and rack 16 in assembled relationship.

When the device is being installed, and assuming that the cable assembly is fitted within the socket portion of the rack and assembled thereto in the manner just described, the rack is adjusted to approximately its midpoint of travel with relation to the bracket 13. The bracket 13 is then positioned and mounted on the bulkhead 11 and the cable assembly 21 is positioned and secured by bracket 35 so that the end 24a (Fig. 2) of the sleeve member 24 lies approximately midway of the length of the socket 23. Stop plates 28 and 29 are secured to each end of the rack by bolts 33 to fix the extreme limits of movement of the rack when the control wheel 27 and shaft 14 are turned. These stop plates engage the sides of the cradle members 19 and 20 to limit movement of the rack in either direction, and thus prevent the sleeve 24 from becoming disengaged with the socket 23 of the rack. The parts, as shown in the drawing, have been moved out of a central or neutral position, and the end 24a of sleeve 24 is approaching the end of the bore 23, as indicated in Fig. 2.

It can thus be seen that the socket member forming part of the rack construction acts as a telescoping extension of the cable casing member 24, and guides the movable cable member 22 for smooth confined movement in either direction in response to movement of the rack as controlled by the shaft 14, pinion 15 and wheel 27.

The supporting bracket 13 provides a very flexible mounting for the parts. With the stop plate 28 removed, the rack and cable assembly can be withdrawn from the bracket, and easily inserted from the direction opposite to that shown in the drawings, such as would be desirable, for example, were it more preferable or necessary to run the push-pull control cable down one side of the vessel than the other.

Likewise, the control shaft 14 can be inserted into the bracket from either direction relative to its base. A reverse position of these parts, from that shown, can be obtained merely by loosening the set screw 15b of the pinion 15, removing the shaft 14 from engagement with the journals 31 and 32, and reinserting it from the base side 17 of the bracket. This would be the type of installation employed if the bracket were mounted with its base on the reverse side of a dashboard such as found in a small runabout, and this condition is schematically illustrated in Fig. 1 by the phantom showing of shaft 14 projecting through the bulkhead 11 which then would correspond to such a dashboard. The base 17 of the bracket can be mounted on whatever structure is provided in any orientation, to position the rack and cable assembly vertically, transversely, or in any intermediate direction.

Those skilled in the art will appreciate that the mechanical advantage afforded by the construction for producing movement of the device controlled by the other end of the cable (not shown), for example, a rudder, can be varied according to the ratio between the rack and pinion, also by the diameter of the wheel 27, and also by the length of the lever arm employed for moving the controlled device. With most watercraft of moderate size, the desired degree of mechanical advantage, as well as range of movement, can be obtained and conventionally is obtained by varying the length of the lever arm to which the rudder is connected.

It is appreciated that constructions differing but equivalent to that disclosed may readily be devised by those skilled in the art, and therefore the scope of the invention is defined by the claims which follow.

I claim:

1. The combination, with a push-pull cable having a movable member contained in a casing, of a rack provided with a socket extending longitudinally thereof, one end and the greater portion of the length of said socket being dimensioned to receive said casing for telescoping sliding movement relative thereto, the other end of said socket being provided with means for connecting said movable cable member thereto whereby said movable member is movable relative to said casing with movement of said rack and that portion of said socket not engaged by said casing forms a continuation thereof for guiding said movable member, a mounting bracket for supporting said rack, said bracket including a cradle within which said rack can be inserted from either direction for slidable support, said bracket further including a shaft supporting portion overlying said cradle, said portion being drilled to receive a control shaft insertable therein from either direction, and a pinion detachably secured on said shaft for rotation therewith and for engagement with said rack.

2. The combination with a push-pull cable of the type having an outer casing and a movable element contained therein, of mechanism for controlling the position of said movable element, said mechanism comprising a rack, said rack being provided with a socket slidably engaging said casing, means for connecting said movable cable element to said rack, a bracket including a cradle within which said rack can be inserted from either direction for slidable support thereby, said bracket having a base and a shaft supporting member projecting from one side of said base, said base and said shaft supporting member each being provided with a journal for receiving a control shaft, said journals being of equal size so said control shaft may be inserted through said journals in either direction, and a pinion detachably secured on said shaft for rotation therewith and for engagement with said rack.

3. The combination with a push-pull cable having an external casing and a movable member contained therein, of a rack provided with a tubular socket dimensioned to receive said movable member and form a continuation of the cable casing, means for connecting said movable cable member to said rack within the socket thereof, and means for supporting said rack for movement relative to said cable casing.

4. The combination with a push-pull cable having a casing and a movable member contained therein, of a member having an elongated socket dimensioned to receive said movable member and casing for sliding engagement relative to the latter, means for securing said movable member within said socket, and means supporting said socket member for telescoping movement of said socket member and movable cable member relative to said cable casing.

5. The combination set forth in claim 4 further characterized by said means for supporting said socket member comprising a bracket in which said socket member is slidably mounted, a shaft carried by said bracket member for rotation by a control device, and means for translating rotation of said shaft into sliding movement of said socket member relative to said bracket.

6. Mechanism for controlling movement of the movable element of a push-pull cable having an external casing surrounding said movable element, comprising a rack including a tubular socket dimensioned to receive said casing element for relative telescoping movement therebetween, means for securing said movable cable element within said socket at a location beyond the end of said casing element, a bracket having means for slidably supporting said rack thereon, a shaft carried by said bracket transverse of the direction of sliding movement of said rack thereon, and a pinion carried by said shaft and meshing with said rack.

7. The combination with a push-pull cable of the type having an outer casing and a movable element contained therein, of mechanism for controlling the position of said movable element, said mechanism comprising a rack, said rack being provided with a socket slidably engaging said casing, means for connecting said movable cable element to said rack, a bracket having means for slidably supporting said rack, a shaft carried by said bracket member for rotation by a control device, and means for translating rotation of said shaft into sliding movement of said rack relative to said bracket and sliding telescoping movement of said socket relative to said casing.

References Cited in the file of this patent

UNITED STATES PATENTS

| | | |
|---|---|---|
| 1,582,378 | Brueckmann | Apr. 27, 1926 |
| 1,704,381 | Caracristi | Mar. 5, 1929 |
| 2,128,986 | Chilton | Sept. 6, 1938 |
| 2,325,671 | Gerry | Aug. 3, 1943 |
| 2,631,469 | Oliner | Mar. 17, 1953 |